United States Patent
Mills et al.

(10) Patent No.: US 7,764,669 B2
(45) Date of Patent: Jul. 27, 2010

(54) SYSTEM AND METHOD PROVIDING FOR INTEROPERABILITY OF SESSION INITIATION PROTOCOL (SIP) AND H.323 FOR SECURE REALTIME TRANSPORT PROTOCOL (SRTP) SESSION ESTABLISHMENT

(75) Inventors: David Wayne Mills, Raleigh, NC (US); Joseph L. Duffy, Plano, TX (US); Henry L. Fourie, Los Gatos, CA (US); Mohammed Taher Shaikh, Fremont, CA (US); Sairam Yadlapati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 11/364,467

(22) Filed: Feb. 27, 2006

(65) Prior Publication Data

US 2007/0201512 A1    Aug. 30, 2007

(51) Int. Cl.
*H04L 12/66*    (2006.01)
*H04L 12/28*    (2006.01)

(52) U.S. Cl. .................. 370/352; 370/401
(58) Field of Classification Search ............ 370/351, 370/389, 400–402, 464–468, 352; 341/5–52; 380/277
See application file for complete search history.

(56) References Cited

U.S. PATENT DOCUMENTS

| 3,963,874 | A  | 6/1976  | Pommerening et al. ...... 179/18 |
| 4,809,321 | A  | 2/1989  | Morganstein et al. ....... 379/211 |
| 6,501,750 | B1 | 12/2002 | Shaffer et al. ............. 370/353 |
| 6,510,162 | B1 | 1/2003  | Fijolek et al. ............. 370/432 |
| 6,546,087 | B2 | 4/2003  | Shaffer et al. ............ 379/90.01 |
| 6,567,505 | B1 | 5/2003  | Omori et al. .................. 379/84 |
| 6,601,099 | B1 | 7/2003  | Corneliussen ............... 709/224 |
| 6,614,899 | B1 | 9/2003  | Sollee et al. ........... 379/218.01 |
| 6,615,236 | B2 | 9/2003  | Donovan et al. ............ 709/203 |
| 6,625,141 | B1 | 9/2003  | Glitho et al. ................. 370/352 |
| 6,636,594 | B1 | 10/2003 | Oran ..................... 379/201.01 |
| 6,658,095 | B1 | 12/2003 | Yoakum et al. .......... 379/93.01 |
| 6,661,799 | B1 | 12/2003 | Molitor ..................... 370/401 |
| 6,665,723 | B2 | 12/2003 | Trossen ..................... 709/227 |
| 6,678,735 | B1 | 1/2004  | Orton et al. ................. 709/230 |
| 6,684,147 | B2 | 1/2004  | Park et al. .................... 701/71 |
| 6,731,625 | B1 | 5/2004  | Eastep et al. ................ 370/352 |
| 6,738,390 | B1 | 5/2004  | Xu et al. ..................... 370/467 |

(Continued)

OTHER PUBLICATIONS

Fouire, Louis "Key Exchange for SRTP using secure Signalling Channels", Aug. 18, 2005, International Telecommunication Union, p. 1 (http://www.packetizer.com/ipmc/h323/standards.html).*

(Continued)

*Primary Examiner*—Ricky Ngo
*Assistant Examiner*—Paul Masur
(74) *Attorney, Agent, or Firm*—Baker Botts L.L.P.

(57) ABSTRACT

To provide for interoperability of Session Initiation Protocol (SIP) and H.323 for Secure Realtime Transport Protocol session establishment, a transmit key is received in a first protocol from a first endpoint. The transmit key is mapped from the first protocol to a second protocol and sent in the second protocol to a second endpoint to establish a secure communication session between the first endpoint and the second endpoint.

17 Claims, 3 Drawing Sheets

U.S. PATENT DOCUMENTS

| | | | |
|---|---|---|---|
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |
| 2004/0184479 A1* | 9/2004 | Yamauchi et al. | 370/466 |
| 2005/0232427 A1* | 10/2005 | Konersmann | 380/277 |
| 2006/0007954 A1* | 1/2006 | Agrawal et al. | 370/466 |
| 2007/0019622 A1* | 1/2007 | Alt et al. | 370/352 |

OTHER PUBLICATIONS

Schulzrinne et al., "RTP Payload for DTMF Digits, Telephony Tones and Telephony Signals," Network Working Group, pp. 1-27, May 2000.

Roach, "Session Initiation Protocol (SIP)-Specific Event Notification," Network Working Group, pp. 1-36, Jun. 2002.

Rosenberg et al., "An Offer/Answer Model with the Session Description Protocol (SDP)," Network Working Group, pp. 1-24, Jun. 2002.

Rosenberg et al., "Caller Preferences for the Session Initiation Protocol (SIP)," Network Working Group, pp. 1-25, Aug. 2004.

Schulzrinne et al., "Session Initiation Protocol (SIP)-H.323 Interworking Requirements," Network Working Group, pp. 1-15, Jul. 2005.

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

R. Mahy et al., "Remote Call Control in SIP using the REFER method and the session-oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

* cited by examiner

US 7,764,669 B2

SYSTEM AND METHOD PROVIDING FOR INTEROPERABILITY OF SESSION INITIATION PROTOCOL (SIP) AND H.323 FOR SECURE REALTIME TRANSPORT PROTOCOL (SRTP) SESSION ESTABLISHMENT

TECHNICAL FIELD

This invention relates generally to the field of telecommunications and, more specifically, to a system and method providing for interoperability of SIP and H.323 for SRTP session establishment.

BACKGROUND

Interoperability between the H.323 and Session Initiation Protocol (SIP) protocols provides for IP telephony. SRTP provides for sending encrypted media between endpoints. The SIP and H.323 signaling standards provide mechanisms for establishing SRTP flows. However, conventional mechanisms do not provide for the interoperability of SIP and H.323 to establish an SRTP session.

SUMMARY OF THE DISCLOSURE

In accordance with the present invention, disadvantages and problems associated with previous techniques for interoperability of SIP and H.323 for SRTP session establishment may be reduced or eliminated.

According to one embodiment of the present invention, a system and method providing for interoperability of SIP and H.323 for SRTP session establishment include receiving a transmit key in a first protocol from a first endpoint. The transmit key is mapped from the first protocol to a second protocol and sent in the second protocol to a second endpoint to establish a secure communication session between the first endpoint and the second endpoint.

Certain embodiments of the invention may provide one or more technical advantages. A technical advantage of one embodiment includes enabling SIP and H.323 endpoints to set up a secure media session using SRTP. Converting between SIP and H.323 provides for establishing the SRTP sessions between the different endpoints. A technical advantage of another embodiment includes providing confidentiality and authentication by public key cryptography between the endpoints exchanging media.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is made to the following description, taken in conjunction with the accompanying drawings, wherein like reference numerals represent like parts, in which.

DETAILED DESCRIPTION OF THE DRAWINGS

Figure 1:
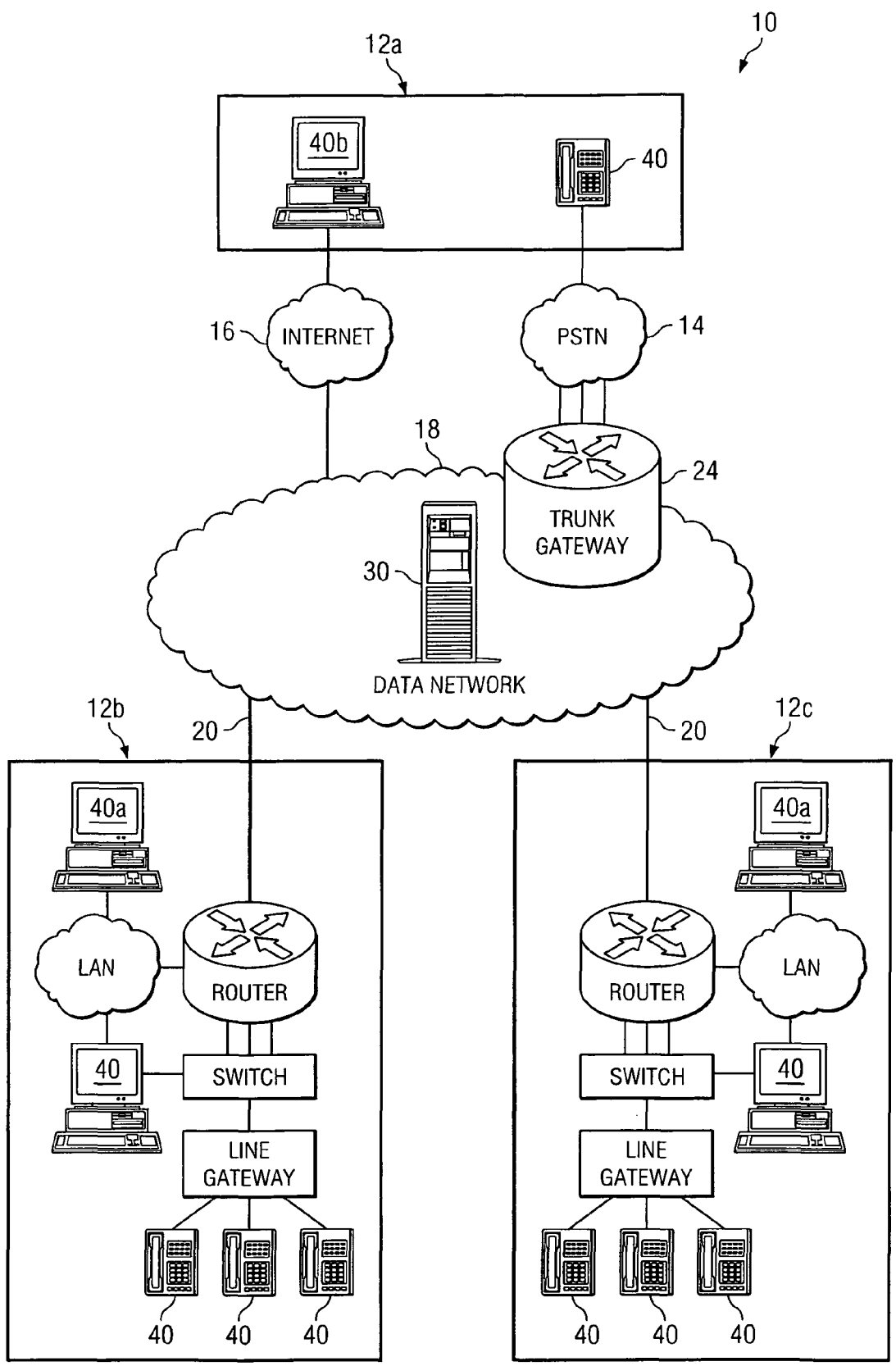
FIG. 1 is a block diagram illustrating a communication system that provides for interoperability of SIP and H.323 for SRTP session establishment.

FIG. 1 is a block diagram illustrating a communication system 10 that provides for interoperability of SIP and H.323 for SRTP session establishment. Communication system 10 includes sites 12a-12c that participate in communication using a public switched telephone network (PSTN) 14, an Internet 16, a data network 18, a link 20, a trunk gateway 24 and/or a call manager 30.

Sites 12 represent any suitable location, such as a residential location or a business, that include endpoints 40. Endpoints 40 may be any combination of hardware and/or software that provide services, such as establishment of communication sessions, for a user. A communication session, or call, may refer to an active communication between endpoints 40, measured from endpoint to endpoint. Information is communicated during a communication session. Information may refer to voice, data, text, audio, video, multimedia, control, signaling, other information, or any combination of the preceding. System 10 may communicate information in packets or any other format or protocol, such as H.323 or SIP.

Thus, some of endpoints 40 are SIP-compatible elements that include hardware and/or software that is operable to receive and to transmit data (directly or indirectly) and to implement the consolidation of media signaling as outlined herein. Note that the term "endpoint" encompasses a myriad of potential devices and infrastructure that may benefit from the operations of system 10. Endpoints 40 may be a personal digital assistant (PDA), a cellular telephone, a standard telephone (which may be coupled to a personal computer) an IP telephone, a personal computer, a laptop computer, a computer running telephony software, a mobile telephone, or any other suitable device or element (or any appropriate combination of these elements) that is operable to receive data or information. Each endpoint 40 may also include suitable network equipment and appropriate infrastructure (e.g., switches, routers, LANs, gateways, etc.) to facilitate a SIP session. FIG. 1 illustrates only one set of example devices that may be used within system 10. The present invention is replete with numerous alternatives that could be used to facilitate the operations of system 10.

It should also be noted that the internal structure of the endpoints are malleable and can be readily changed, modified, rearranged, or reconfigured in order to achieve their intended operations, as they pertain to the establishment of an SRTP session. Note also that the endpoints can each include a link to call manager 30, which is operable to communicate with any number of endpoints/user agents/devices.

In addition to endpoints 40, sites 12b and 12c include a local area network (LAN), a router, a switch, and a line gateway. Sites 12b and 12c communicate with data network 18 over link 20. Link 20 may include any suitable link, such as a digital subscriber line (DSL) link, a T1 link, a fiber optic link, or a wireless link.

Call manager 30 manages endpoints 40 and manages the communication between endpoints 40. Call manager 30 is an application that controls call processing, routing, telephone features and options (such as call hold, call transfer, and caller identification), device configuration, and other telephony functions and parameters within system 10. Call manager 30 controls endpoints 40 coupled to network 18 or endpoints 40 may couple directly to call manager 30

In one embodiment, call manager 30 is a Call Manager element, which is manufactured by Cisco Systems, Inc. of San Jose, Calif. The Call Manager element is SIP-enabled, and it can readily accommodate other protocols (e.g., H.323). In other embodiments, call manager 30 is any suitable component (e.g. a gateway, a switch, a router, a bridge, a state machine, a processor, etc.) that is operable to interface with endpoints/end-users.

Software and/or hardware may reside in call manager 30 to achieve the teachings of establishing an SRTP session of the present invention, as outlined herein. However, due to its flexibility, call manager 30 may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of call manager 30 in the context of communication system 10 and, accordingly, it should be construed as such.

In one embodiment of system 10, call manager 30 facilitates interoperability between H.323 endpoints 40 and SIP endpoints 40 by implementing software to function as an H.323-SIP gateway. Call manager 30 translates H.323 call signaling to SIP and vice-versa. Call manager 30 includes H.323 and SIP stacks that provide for operation as a gateway between H.323 and SIP. The gateway software initializes the stacks and translates the signaling from one type to the other. For instance, when call manager 30 receives an incoming H.323 SETUP message, it sends an outgoing SIP INVITE message.

In an exemplary embodiment of operation, H.323 endpoint 40a and SIP endpoint 40b exchange encrypted media using SRTP. Setting up a SRTP session between H.323 endpoint 40a and SIP endpoint 40b requires the exchange of SRTP cryptographic transmission keys between the endpoints. To signal, negotiate, and transport SRTP keys within the SIP network, Sdescriptions (Session Description Protocol (SDP) structures) are defined in SDP. To signal, negotiate, and transport SRTP keys within the H.323 network, H.245 procedures (H.235.8 structures) are defined in H.235.8.

To facilitate the encrypted communication between H.323 endpoint 40a and SIP endpoint 40b, call manager 30 maps the transmission key from one protocol to another during communication. The mapping may occur in any suitable manner. For example, call manager 30 may insert the transmission key into an H.235.8 data structure to provide for the interworking between the protocols. In an example embodiment, call manager 30 maps the following: an SDP crypto-line into an H.245 Open Logical Channel (OLC), an SDP crypto-suite into an H.235.8 cryptoSuite, an SDP srtp-key-info into an H.235.8 srtpKeyParameters, and an SDP srtp-session-param into an H.235.8 srtpSessionParameters. Interworking between SDP and H.235.8 structures provides for negotiating SRTP keys in a single round-trip message exchange between the caller and the callee. Therefore, communication between H.323 endpoint 40a and SIP endpoint 40b may be secure even though the endpoints communicate using different protocols.

Modifications, additions, or omissions may be made to system 10. For example, system 10 may include any suitable number of sites 12 and may facilitate communication between any suitable number of sites 12. Moreover, the operations of system 10 may be performed by more, fewer, or other components. Additionally, operations of system 10 may be performed using any suitable logic.

Figure 2:
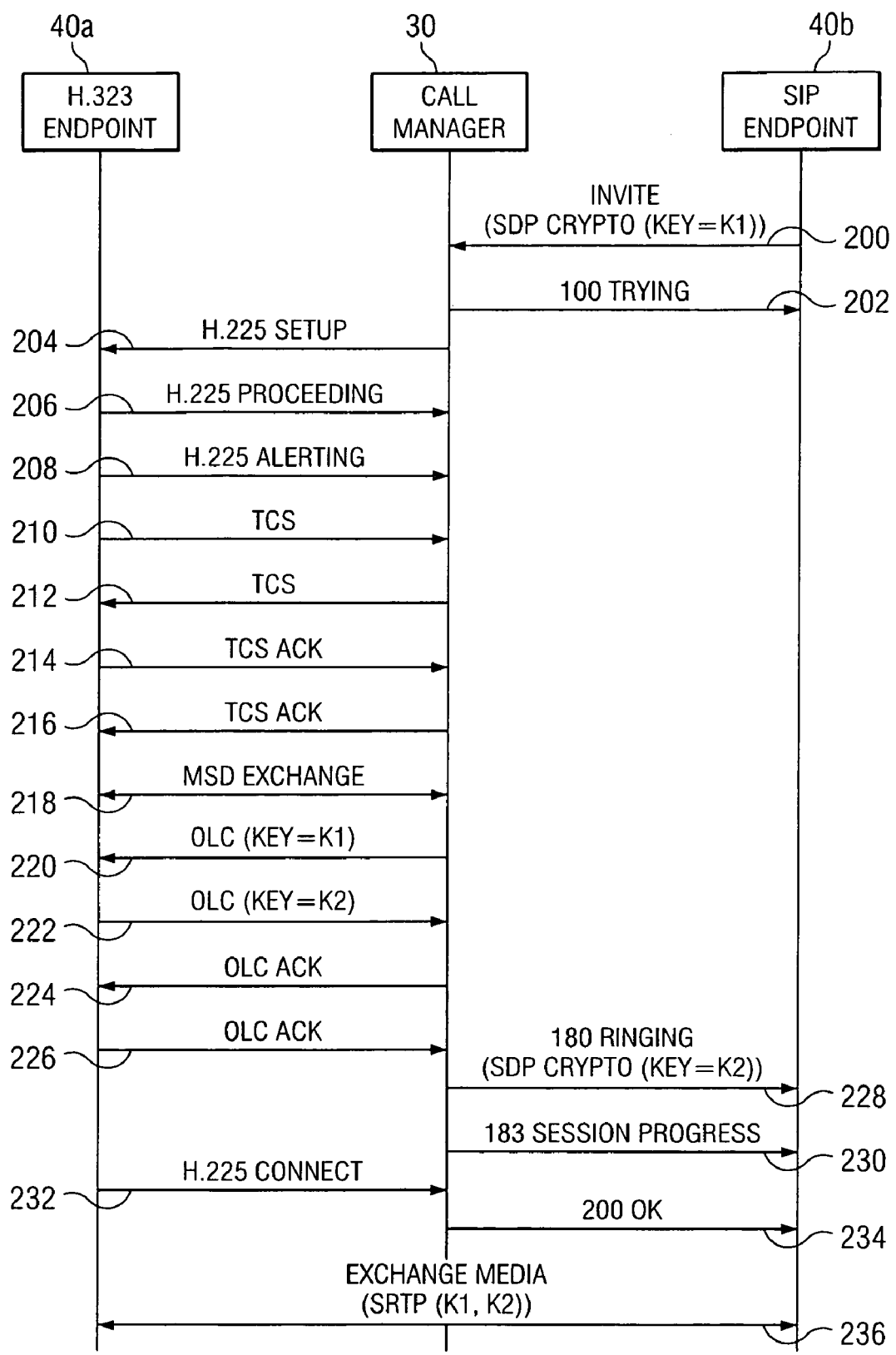
FIG. 2 is a call-flow diagram illustrating a SIP endpoint establishing an SRTP encrypted call with an H.323 endpoint.

FIG. 2 is a call-flow diagram illustrating a SIP endpoint 40b establishing an SRTP encrypted call with an H.323 endpoint 40a. SIP endpoint 40b generates an INVITE message and sends it to call manager 30 in message 200. SIP endpoint 40b generates the INVITE to begin a call with H.323 endpoint 40a. Within the INVITE, SIP endpoint 40b inserts the SRTP transmission key into an SDP data structure. For example, the transmission key is K1. The transmission key may be inserted into an SDP crypto-line. Call manager 30 responds with a 100 Trying message in message 202.

Call manager 30 begins setup of the call with H.323 endpoint 40a on behalf of SIP endpoint 40b. Call manager 30 sends an H.225 Setup message in message 204 to H.323 endpoint 40a. H.323 endpoint 40a responds with an H.225 Proceeding message in message 206 and an H.225 Alerting message in message 208. H.323 endpoint 40a also sends a Terminal Capability Set (TCS) message to call manager 30 at message 210. The TCS message includes the capabilities of H.323 endpoint 40a for the connection, such as the types of codecs to use. Call manager 30 sends a TCS message to H.323 endpoint 40a at message 212 with the connection capabilities of SIP endpoint 40b. Each TCS message is acknowledged between H.323 endpoint 40a and call manager 30 in messages 214 and 216.

At message 218, a master/slave determination (MSD) exchange occurs. For example, the MSD exchange includes: H.323 endpoint 40a sends a MSD to call manager 30, call manager 30 acknowledges the MSD, call manager 30 sends a MSD to H.323 endpoint 40a, and H.323 endpoint 40a acknowledges the MSD from call manager 30.

The establishment of the media path begins with the exchange of OLC messages. Call manager 30 sends an OLC to H.323 endpoint 40a at message 220. In an embodiment, the call setup occurs using an H.323 slow-start setup. The OLC includes the transmission key from SIP endpoint 40a, K1, in a protocol understandable to H.323 endpoint 40a. Because the transmission key of SIP endpoint 40a was originally in an SDP structure, call manager 30 maps the transmission key to an H.235.8 structure for H.323 endpoint 40a to understand.

H.323 endpoint 40a accepts the transmission key received in the OLC and generates its own transmission key, which is K2. H.323 endpoint 40a sends an OLC back to call manager 30 at message 222 that includes the generated transmission key. The OLC includes the SRTP transmission key of H.323 endpoint 40a. The transmission key is provided in an H.235.8 structure. Call manager 30 and H.323 endpoint 40a each acknowledge receipt of the OLC messages by responding with OLC ACKs in messages 224 and 226. These OLC ACKs also allow the H.323 and SIP media ports to be exchanged.

Now that call manager 30 has the transmission key of H.323 endpoint 40a, it sends an 180 Ringing message and an 183 Session Progress message to SIP endpoint 40b in messages 228 and 230. The 183 Session Progress message includes the session parameters and the transmission key, K2, of H.323 endpoint 40a, which call manager 30 has mapped into an SDP structure. H.323 endpoint 40a sends an H.225 Connect message to call manager 30 at message 232, and call manager 30 sends a 200 OK to SIP endpoint 40b at message 234, which includes the SRTP key for the session, which is K1, K2. At 236, H.323 endpoint 40a and SIP endpoint 40b begin exchanging media.

Figure 3:
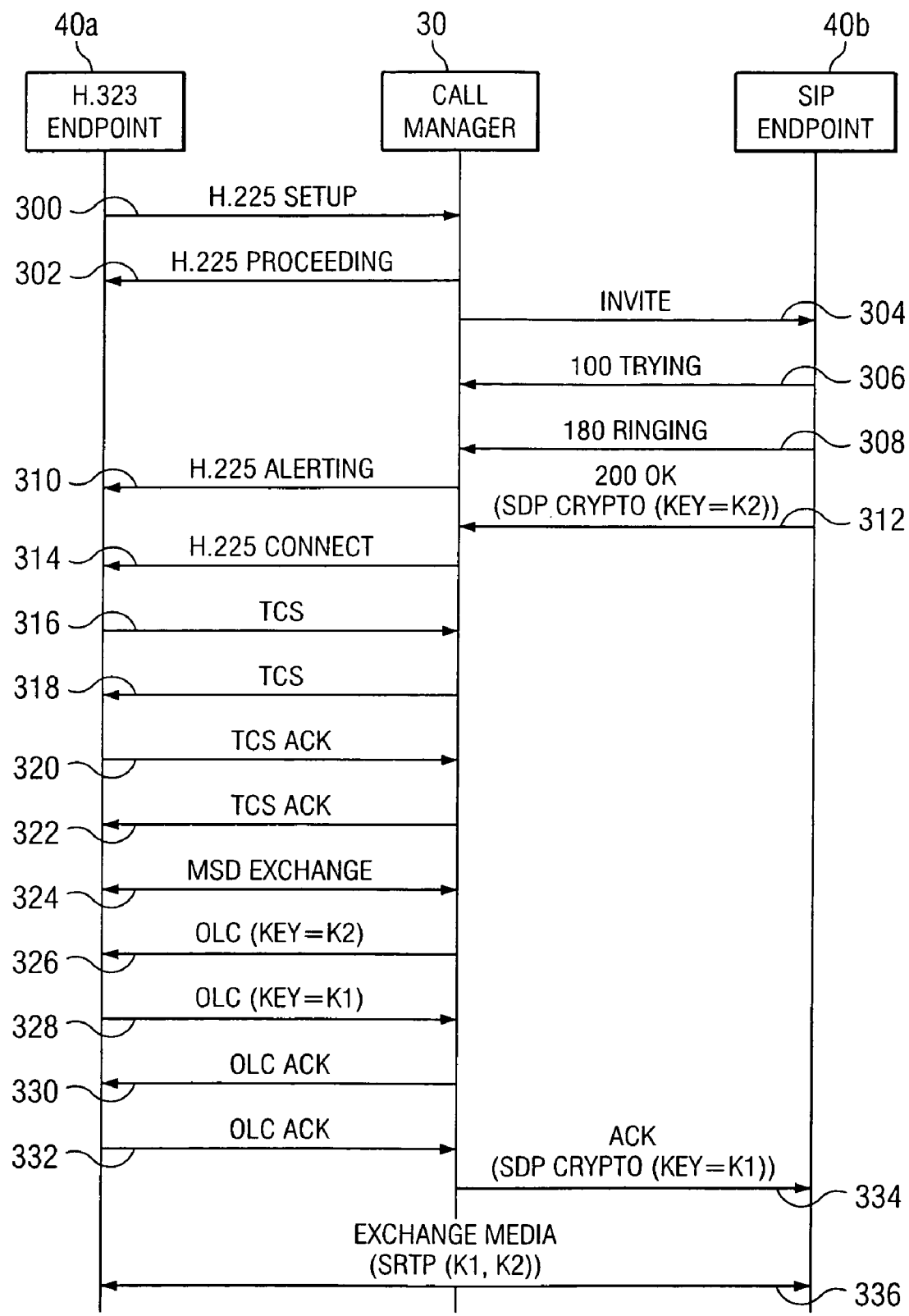
FIG. 3 is a call-flow diagram illustrating the H.323 endpoint establishing an SRTP encrypted call with the SIP endpoint.

FIG. 3 is a call-flow diagram illustrating the H.323 endpoint establishing an SRTP encrypted call with the SIP endpoint. H.323 endpoint 40a sends a H.225 Setup message to call manager 30 at message 300. H.323 endpoint 40a sends the setup message to begin a call with SIP endpoint 40b. Call manager 30 responds with an H.225 Proceeding message at message 302.

At message 304, call manager sends an INVITE to SIP endpoint 40b that informs SIP endpoint 40b of H.323 endpoint 40a offer to begin a call. SIP endpoint 40b responds with an 100 Trying message and an 180 Ringing message in messages 306 and 308. Call manager sends an H.225 Alerting message to H.323 endpoint 40a at message 310.

Because the call will be encrypted, SIP endpoint 40b sends a 200 OK to call manager 30 in message 312. The 200 OK includes the SRTP transmission key of SIP endpoint 40b in an SDP structure. For example, the transmission key is K2. Call manager 30 sends an H.225 Connect message to H.323 endpoint 40b in message 314 to continue establishing the call between H.323 endpoint 40a and SIP endpoint 40b. H.323 endpoint 40a sends a TCS that includes capabilities to call manager 30 in message 316. Call manager 30 responds with a TCS that includes its capabilities in message 318. H.323 endpoint 40a and call manager 30 each acknowledge receipt of the other's TCS by sending a TCS ACK in messages 320 and 322. At message 324, the MSD exchange occurs, and the establishment of the media path begins.

Call manager 30 sends an OLC to H.323 endpoint 40a in message 326. Call manager 30 maps the SRTP transmission key of SIP endpoint 40b into an H.235.8 structure and includes the transmission key, K2, in the OLC. H.323 endpoint 40a generates a transmission key to use in the encrypted call. H.323 endpoint 40a sends an OLC to call manager 30 in message 328, which includes its generated transmission key. For example, the transmission key is K1. Call manager 30 and H.323 endpoint 40a each acknowledge receipt of the OLC messages by responding with an OLC ACK in messages 330 and 332.

Call manager 30 acknowledges the 200 OK from message 312 by sending an ACK to SIP endpoint 40b in message 334. The ACK includes the SRTP key for H.323 endpoint 40a, which is K1, in an SDP structure. At 336, H.323 endpoint 40a and SIP endpoint 40b begin exchanging media using transmission keys K1 and K2.

Modifications, additions, or omissions may occur in the call-flow diagrams presented in FIGS. 2 and 3. For example, the call setup may occur using a fast-start setup. As another example, the called endpoint or the calling endpoint may initiate the key exchange procedures.

As yet another example, a Cryptographic Message Service (CMS) is used to provide confidentiality and authentication between endpoints 40. H.235.8 structures and SDP structures rely on encapsulating security protocols, for example, IP security (IPsec) or Transport Layer Security (TLS), to protect the SRTP transmission keys between endpoint 40 and call manager 30. IPsec and TLS each terminate on call manager 30. Instead of having security that terminates on call manager 30, end-to-end security between endpoints 40 may be provided by public key cryptography using CMS.

Using CMS, the SRTP key from sending endpoint 40 to receiving endpoint 40 is encrypted with the public key of receiving endpoint 40 and signed with the private key of sending endpoint 40. H.235.8 specifies that the SRTP key be encrypted within a CMS EnvelopedData body and signed by a detached CMS SignedData body. For SIP, call manager 30 creates a related, multi-part Multipurpose Internet Mail Extension (MIME) type. The MIME type contains an SDP MIME header and two application/pkcs7-mime S/MIME headers, one with smime-type=enveloped-data and the other with smime-type=signed-data. Call manager 30 copies the CMS EnvelopedData body from the OLC message to the application/pkcs7-mime S/MIME header, which is smime-type=enveloped data. The CMS SignedData body from the OLC message is copied to the application/pkcs7-mime S/MIME header, which is smime-type=signed-data in the SIP INVITE message. Accordingly, the SRTP key is delivered end-to-end in CMS message bodies.

Furthermore, the call-flows may include more, fewer, or other messages. Additionally, messages may be performed in any suitable order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method providing for interoperability of Session Initiation Protocol (SIP) and H.323 for Secure Realtime Transport Protocol session establishment, comprising:
   receiving, from a first endpoint comprising hardware, a transmit key generated by the first endpoint in a first protocol;
   mapping the transmit key from the first protocol to a second protocol, wherein mapping the transmit key comprises inserting the transmit key into a data structure associated with the second protocol and the data structure represents a Session Description Protocol (SDP) structure if the second protocol is SIP, the SDP structure including a Multipurpose Internet Mail Extension (MIME), and the data structure represents an H.235.8 structure if the second protocol is H.323, the H.235.8 structure including the transmit key in a Cryptographic Message Service (CMS) EnvelopedData body and is signed by a CMS SignedData body; and
   sending the transmit key in the second protocol to a second endpoint comprising hardware to establish a secure communication session between the first endpoint and the second endpoint, wherein the transmit key is negotiated between the first endpoint and the second endpoint in a single round-trip message exchange.

2. The method of claim 1, wherein the first endpoint is an H.323 endpoint and the first protocol is H.323, and the second endpoint is a SIP endpoint and the second protocol is SIP.

3. The method of claim 1, wherein the first endpoint is a SIP endpoint and the first protocol is SIP, and the second endpoint is an H.323 endpoint and the second protocol is H.323.

4. The method of claim 1, further comprising providing authentication of the transmit key between the first endpoint and the second endpoint.

5. The method of claim 4, wherein providing authentication of the transmit key comprises:
   encrypting the transmit key with a public key of the second endpoint; and
   signing the transmit key with a private key of the first endpoint.

6. A non-transitory computer-readable medium comprising logic for providing interoperability of Session Initiation Protocol (SIP) and H.323 for Secure Realtime Transport Protocol session establishment, the logic when executed by a processor operable to:
   receive, from a first endpoint, a transmit key generated by the first endpoint in a first protocol;
   map the transmit key from the first protocol to a second protocol, wherein mapping the transmit key comprises inserting the transmit key into a data structure associated with the second protocol and the data structure represents a Session Description Protocol (SDP) structure if the second protocol is SIP, the SDP structure including a Multipurpose Internet Mail Extension (MIME), and the data structure represents an H.235.8 structure if the second protocol is H.323, the H.235.8 structure including the transmit key in a Cryptographic Message Service (CMS) EnvelopedData body and is signed by a CMS SignedData body; and send the transmit key in the second protocol to a second endpoint to establish a secure communication session between the first endpoint and the second endpoint, wherein the transmit key is negotiated between the first endpoint and the second endpoint in a single round-trip message exchange.

7. The medium of claim 6, wherein the first endpoint is an H.323 endpoint and the first protocol is H.323, and the second endpoint is a SIP endpoint and the second protocol is SIP.

8. The medium of claim 6, wherein the first endpoint is a SIP endpoint and the first protocol is SIP, and the second endpoint is an H.323 endpoint and the second protocol is H.323.

9. The medium of claim 6, further operable to provide authentication of the transmit key between the first endpoint and the second endpoint.

10. The medium of claim 9, wherein providing authentication of the transmit key comprises:

encrypting the transmit key with a public key of the second endpoint; and signing the transmit key with a private key of the first endpoint.

11. A system providing for interoperability of Session Initiation Protocol (SIP) and H.323 for Secure Realtime Transport Protocol session establishment, comprising:

a first endpoint and a second endpoint operable to exchange media using a secure session, wherein the first endpoint communicates using a first protocol and the second endpoint communicates using a second protocol; and a call manager operable to:

receive, from the first endpoint, a transmit key generated by the first endpoint in the first protocol;

map the transmit key from the first protocol to the second protocol, wherein mapping the transmit key comprises inserting the transmit key into a data structure associated with the second protocol and the data structure represents a Session Description Protocol (SDP) structure if the second protocol is SIP, the SDP structure including a Multipurpose Internet Mail Extension (MIME), and the data structure represents an H.235.8 structure if the second protocol is H.323, the H.235.8 structure including the transmit key in a Cryptographic Message Service (CMS) EnvelopedData body and is signed by a CMS SignedData body; and send the transmit key in the second protocol to the second endpoint to establish a secure communication session between the first endpoint and the second endpoint, wherein the transmit key is negotiated between the first endpoint and the second endpoint in a single round-trip message exchange.

12. The system of claim 11, wherein the first endpoint is an H.323 endpoint and the first protocol is H.323, and the second endpoint is a SIP endpoint and the second protocol is SIP.

13. The system of claim 11, wherein the first endpoint is a SIP endpoint and the first protocol is SIP, and the second endpoint is an H.323 endpoint and the second protocol is H.323.

14. The system of claim 11, the call manager further operable to provide authentication of the transmit key between the first endpoint and the second endpoint.

15. The system of claim 14, wherein providing authentication of the transmit key comprises:

encrypting the transmit key with a public key of the second endpoint; and signing the transmit key with a private key of the first endpoint.

16. A system providing for interoperability of Session Initiation Protocol (SIP) and H.323 for Secure Realtime Transport Protocol session establishment, comprising:

means for receiving, from a first endpoint, a transmit key generated by the first endpoint in a first protocol;

means for mapping the transmit key from the first protocol to a second protocol, wherein means for mapping the transmit key comprises means for inserting the transmit key into a data structure associated with the second protocol and the data structure represents a Session Description Protocol (SDP) structure if the second protocol is SIP, the SDP structure including a Multipurpose Internet Mail Extension (MIME), and the data structure represents an H.235.8 structure if the second protocol is H.323, the H.235.8 structure including the transmit key in a Cryptographic Message Service (CMS) EnvelopedData body and is signed by a CMS SignedData body; and means for sending the transmit key in the second protocol to a second endpoint to establish a secure communication session between the first endpoint and the second endpoint, wherein the transmit key is negotiated between the first endpoint and the second endpoint in a single round-trip message exchange.

17. A method providing for interoperability of Session Initiation Protocol (SIP) and H.323 for Secure Realtime Transport Protocol session establishment, comprising:

receiving, from a first endpoint comprising hardware, a first transmission key generated by the first endpoint in a first protocol;

mapping the first transmission key from the first protocol to a second protocol, wherein mapping the first transmission key comprises inserting the transmission key into a data structure associated with the second protocol and the data structure represents a Session Description Protocol (SDP) structure if the second protocol is SIP, the SDP structure including a Multipurpose Internet Mail Extension (MIME), and the data structure represents an H.235.8 structure if the second protocol is H.323, the H.235.8 structure including the transmit key in a Cryptographic Message Service (CMS) EnvelopedData body and is signed by a CMS SignedData body;

sending the first transmission key in the second protocol to a second endpoint comprising hardware to establish a secure communication session between the first endpoint and the second endpoint;

in response to the second endpoint receiving the first transmission key, receiving, from the second endpoint, a second transmission key generated by the second endpoint in the second protocol;

mapping the second transmission key from the second protocol to the first protocol;

sending the second transmission key in the first protocol to the first endpoint;

sending an acknowledgement to the first endpoint, wherein the acknowledgement includes the first transmission key and the second transmission key;

facilitating an exchange of media between the first and second endpoints according to the first and second transmission keys.

* * * * *